UNITED STATES PATENT OFFICE.

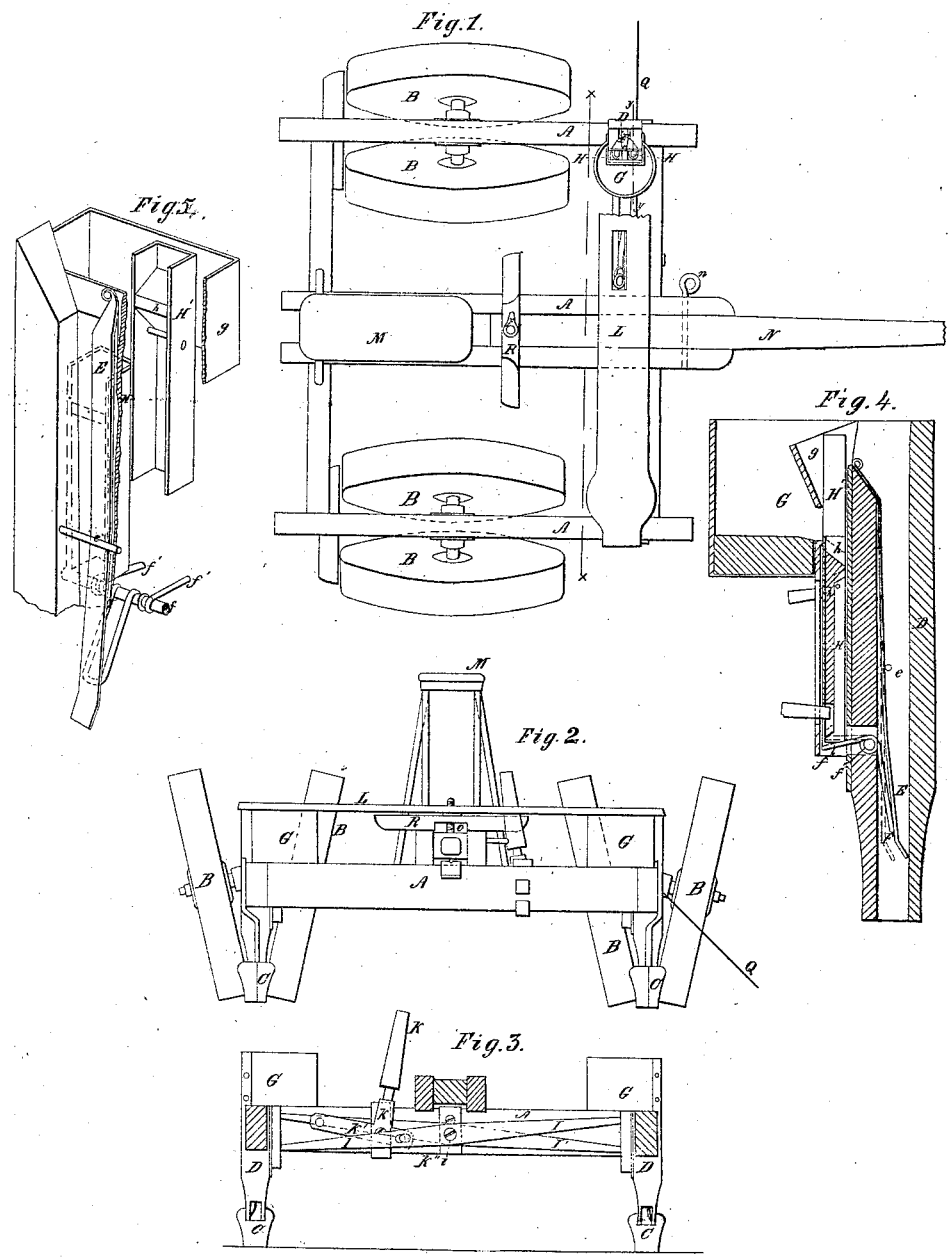

LEVI F. STRAIGHT, OF FAIRBURY, ILLINOIS.

IMPROVEMENT IN CORN-PLANTERS.

Specification forming part of Letters Patent No. 30,008, dated September 11, 1860.

*To all whom it may concern:*

Be it known that I, LEVI F. STRAIGHT, of Fairbury, in the county of Livingston and State of Illinois, have invented certain new and useful Improvements in Seed-Planters; and I do hereby declare the following to be a full, clear, and exact description of the same, reference being had to the accompanying drawings, making part of this specification.

The nature of my said invention consists, first, in a peculiar combination of levers for operating the seeding-slides; and, second, in devices for adapting the machine to plant in hills or drills, as hereinafter explained.

In the accompanying drawings, Figure 1 is a top view of a machine embodying my improvements with one seed-box exposed. Fig. 2 is a front view of the same. Fig. 3 is a section at $x\ x$, looking toward the front. Fig. 4 is an enlarged vertical section of one seeding-box at $y\ y$, looking toward the rear. Fig. 5 is a detached perspective view of a pair of the seeding-slides and accessory valve-lever.

A is the main frame of the implement, supported on wheels B, set obliquely in pairs, one pair being made to follow each seeding-tube, as will be hereinafter explained. The oblique axles upon which the wheels B run may be either constructed in bent form, one to each pair of wheels, or may be separate and fixed to the frame by flanges and bolts, as in the present illustration.

C are the plows or drill-teeth for opening the ground to receive the seed; D, the conducting-tubes, fixed immediately in the rear of the plows C, and provided with valves E, which, being confined by pins $c$, tend to spring open, but are, excepting at the instant of depositing seed, held in a closed position through the medium of bent and forked levers F, pivoted at $f$, and extending inwardly beneath the valves, and outwardly in separate arms $f'$ beneath each of the slides H H', hereinafter described, so that the depression of either of the slides by bearing upon one of the arms $f'$ will close the valve.

G are the seed-hoppers.

H H' are the seeding-slides, one pair of which work within a casing attached to the exterior of each tube.

$g$ represents a customary guard to prevent the overflow or irregular discharge of the grain. The slides H H' are operated by means of the following mechanism:

I I' are a pair of levers extending from side to side of the machine, and working upon a fixed center at $i$.

K is the handle of a T-shaped lever, the arms K' K'' of which are of unequal length. The said lever works upon a fixed fulcrum at $k$. The outer end of the shorter arm, K'', is connected with the lever I, near the center $i$, by means of a pin and slot, and that of the longer arm, K', to the lever I', at a distance from the center, by similar means, the lengths of the arms being of the same relative proportion as the distances from the center $i$ of their respective points of connection with the levers I I'.

L is an operator's seat extending from side to side of the machine, covering the seed-boxes.

M is a driver's seat to the rear of the axles.

N is a tongue by which the machine is drawn forward. The said tongue is attached by a horizontal bolt, $n$, at the front of the machine, and at its rear end by a vertical screw-bolt, $o$, and set-nut $p$, so as to allow the tongue vertical play within any desired limit. By this means the plows may be made to enter the ground or raised above it, accordingly as the driver is seated upon the seat L or M.

Q is an indicator to enable the operator to tell with accuracy when the seeding-tubes have arrived at the proper line to plant.

R represents a foot-board.

The operation is as follows: The driver seats himself upon the seat L, grasping the handle J with one hand and holding it firmly at one end of its stroke, by which means one seeding-slide of each pair is held at its highest and the other at its lowest point, the latter being made to press upon an arm, $f$, of the bent lever F, and thereby hold the valve E in a closed position, so as to prevent the escape of the grain contained in the tube. Upon arriving upon the right spot, as shown by the indicator, the operator then suddenly throws the handle J to the other extremity of its stroke, thereby reversing the positions of the levers, and elevating the slide which was previously depressed, and vice versa. The cup $h'$ at top of the depressed slide is immediately filled with grain flowing from the hopper G beneath the lower edge of the guard $g$, while that at top of elevated slide deposits its charge of grain in the tube G. The same movement causes also an instantaneous opening and closing again of the valve E, so as to deposit a charge of seed in the ground and arrest the succeeding charge, which is thrown into the tube by the elevation of the slide H or H'. The oblique wheels B, following, effectually cover the seed, compact the earth about it, and leave the ground in the most favorable form for the growth of the young plant.

In order to plant in drills, the valves E are drawn out of the tubes by their upper end, enenabling the grain to fall immediately through the tube instead of being compacted together, as in the former case, and, in addition to this the forked wire F, extending across the tube, tends still more to scatter the grain and cause it to lie uniformly along the drill.

To take the machine from the field or remove it from place to place without seeding, the operator changes his position to the rear seat, M, thereby elevating the plows from the ground.

To enable the operator to regulate the quantity of seed deposited at each movement, the slides H H' are constructed in hollow form with internal slides, h, the adjustment of which up or down regulates the capacity of the cup h' to any extent desired.

The back part of the slide is made hollow, as represented, to permit grain or other matter which may fall between the slide and the tube and would otherwise interfere with the motion of the former to escape freely at bottom.

The following is what I claim as new and of my invention herein:

1. The combination and arrangement of levers I I and K' K'', constructed and operating in the manner and for the purposes set forth.

2. The combination of the removable valve E, forked lever F, and slides H H', arranged and operating substantially as and for the purposes set forth.

3. The combination of the internal adjustable slide, h, with the vertical hollow-backed seeding-slide H or H', constructed, arranged, and operating, in connection with the conducting-tube D, in the manner and for the purposes set forth.

In testimony of which invention I hereunto set my hand.

LEVI F. STRAIGHT.

Witnesses:
A. J. CROPSY,
JACOB HUNT.